United States Patent
Hodrus

(10) Patent No.: US 11,536,297 B2
(45) Date of Patent: Dec. 27, 2022

(54) METHOD FOR OPERATING A HYDROSTATIC ACTUATOR SYSTEM

(71) Applicant: Schaeffler Technologies AG & Co. KG, Herzogenaurach (DE)

(72) Inventor: Erhard Hodrus, Achern (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 58 days.

(21) Appl. No.: 17/259,234

(22) PCT Filed: Jun. 11, 2019

(86) PCT No.: PCT/DE2019/100532
§ 371 (c)(1),
(2) Date: Jan. 11, 2021

(87) PCT Pub. No.: WO2020/015775
PCT Pub. Date: Jan. 23, 2020

(65) Prior Publication Data
US 2021/0285469 A1    Sep. 16, 2021

(30) Foreign Application Priority Data
Jul. 18, 2018 (DE) .......................... 102018117341.5

(51) Int. Cl.
*F15B 19/00* (2006.01)
*F15B 15/20* (2006.01)
(Continued)

(52) U.S. Cl.
CPC ............ *F15B 19/005* (2013.01); *F15B 7/08* (2013.01); *F15B 7/10* (2013.01); *F15B 9/03* (2013.01);
(Continued)

(58) Field of Classification Search
CPC ...... F15B 7/08; F15B 7/10; F15B 9/03; F15B 19/005
(Continued)

(56) References Cited

U.S. PATENT DOCUMENTS

| 7,703,348 | B2 * | 4/2010 | Reisch | ................ F16H 61/0202 74/473.11 |
| 8,380,412 | B2 * | 2/2013 | Vollert | .................. B60T 13/662 188/72.4 |

(Continued)

FOREIGN PATENT DOCUMENTS

| DE | 102010047800 A1 | 5/2011 |
| DE | 102010047801 A1 | 5/2011 |

(Continued)

*Primary Examiner* — Michael Leslie

(57) ABSTRACT

A hydrostatic actuator system includes an electric motor for delivering a hydraulic fluid via a piston unit. The actuator system is operating using a method in which a change in volume caused by a temperature change is sensed by a pressure measurement. The method reliably identifies a state of the transfer of the hydraulic fluid from a planetary roller transmission compartment into the master piston. The pressure measurement is continuously evaluated, and, in the event of a negative signal of the pressure measurement, suction of the hydraulic fluid by a planetary roller transmission lying in the hydraulic fluid between the electric motor and the piston unit into the piston unit is recognized and a fault signal is output.

15 Claims, 3 Drawing Sheets

(51) Int. Cl.
*F15B 7/10* (2006.01)
*F15B 9/03* (2006.01)
*F15B 7/08* (2006.01)

(52) U.S. Cl.
CPC ........... *F15B 15/20* (2013.01); *F15B 2211/63* (2013.01); *F16D 2500/1024* (2013.01); *F16D 2500/5016* (2013.01)

(58) Field of Classification Search
USPC .......................................... 60/534, 535, 545
See application file for complete search history.

(56) References Cited

U.S. PATENT DOCUMENTS

| | | | | |
|---|---|---|---|---|
| 8,490,391 | B2* | 7/2013 | Franz | H02K 11/38 60/545 |
| 9,051,974 | B2* | 6/2015 | Gramann | F16H 25/2252 |
| 9,388,866 | B2* | 7/2016 | Chimner | F16D 48/02 |
| 9,784,256 | B2* | 10/2017 | Franz | F15B 7/08 |
| 9,803,705 | B2* | 10/2017 | Heubner | F16D 25/12 |
| 10,487,926 | B2* | 11/2019 | Schumann | F16D 23/12 |
| 10,487,927 | B2* | 11/2019 | Schumann | F16H 25/2266 |
| 11,378,143 | B2* | 7/2022 | Hodrus | F16D 23/12 |
| 2017/0108056 | A1* | 4/2017 | Greb | F16D 23/12 |

FOREIGN PATENT DOCUMENTS

| | | |
|---|---|---|
| DE | 102011103774 A1 | 12/2011 |
| DE | 102012204940 A1 | 10/2012 |
| DE | 102013220324 A1 | 4/2014 |
| DE | 102014210697 A1 | 12/2015 |
| DE | 102016223037 A1 | 5/2018 |
| WO | 2015070849 A1 | 5/2015 |
| WO | 2015117612 A2 | 8/2015 |
| WO | 2015149775 A1 | 10/2015 |

* cited by examiner

METHOD FOR OPERATING A HYDROSTATIC ACTUATOR SYSTEM

CROSS-REFERENCE TO RELATED APPLICATIONS

This application is the U.S. National Phase of PCT Appln. No. PCT/DE2019/100532 filed Jun. 11, 2019, which claims priority to DE 102018117341.5 filed Jul. 18, 2018, the entire disclosures of which are incorporated by reference herein.

TECHNICAL FIELD

The disclosure relates to a method for operating a hydrostatic actuator system, in which an electric motor is used for delivering a hydraulic fluid in the actuator system having a piston unit, in which a change in volume caused by a temperature change is sensed by a pressure measurement.

BACKGROUND

From DE 10 2010 047 801 A1, a hydrostatic actuator is known which has a master cylinder which is contained in a housing and has a piston which is axially displaceable in the housing and applies pressure to a pressure chamber filled with pressure medium, a planetary roller transmission which converts a rotary drive into an axial movement, and a threaded spindle and planetary rolling elements which roll between them, and an electric motor which drives the planetary roller transmission with a stator which is firmly connected to the housing.

WO 2015/070849 A1 discloses a piston-cylinder unit for the hydraulic actuation of a clutch in a vehicle with a piston, with a cylinder and with a sealing means, wherein the piston-cylinder unit is fluidically connected to a fluid circuit, wherein the piston is axially displaceable in the cylinder and wherein the sealing means is sealingly arranged between the piston and the cylinder. A sensor is arranged in or on the piston-cylinder unit, by means of which a pressure in the interior of the piston-cylinder unit and/or in the fluidically connected fluid circuit can be measured.

In the case of modular hydrostatic clutch actuators, the entire clutch actuator runs in a hydraulic fluid. Thus, the chamber of the planetary roller transmission is also filled with the hydraulic medium. At low temperatures, the hydraulic fluid becomes viscous, wherein the modular hydrostatic clutch actuator draws the hydraulic fluid from the chamber of the planetary roller transmission into a piston unit, which changes the fluid volume in the system and the slave piston moves inadvertently. As this process can be repeated any number of times, the relationship between the slave piston position and the master piston position becomes undetermined, which can lead to mechanical damage to the clutch actuator.

SUMMARY

It is desirable to have a method for operating a hydrostatic actuator system in which the state of the passage of the hydraulic fluid from the planetary roller transmission space into the master piston is reliably detected.

This is achieved by continuously evaluating the pressure measurement and, in the event of a negative signal of the pressure measurement, recognizing suction of the hydraulic fluid by the planetary roller transmission lying in the hydraulic fluid into the piston unit and outputting a fault signal. Due to the exact detection of the suction process, countermeasures can be triggered immediately as a result of the fault signal in order to prevent damage to the hydrostatic actuator system. It is further assumed here that a negative pressure signal is understood to mean a pressure that is negative to atmospheric pressure.

A fault signal is advantageously output if the negative signal of the pressure measurement lasts for a predetermined period of time. This predetermined period of time ensures that the state of suction of the hydraulic fluid from the planetary roller transmission into the piston unit actually exists. Other momentary faults can thus be safely avoided.

In one embodiment, the negative pressure signal is less than 0 bar, preferably less than −0.2 bar. This ensures that even the smallest negative signals can trigger a fault reaction in order to compensate for the volume change in the hydrostatic actuator system caused by the suction.

In one embodiment, the predetermined time period is at least 0.3 seconds. In this relatively short period of time, a reliable assertion can be made as to whether the state of suction of the hydraulic fluid from the planetary roller transmission into the piston unit has actually occurred.

In one variant, a position signal of the actuator system is continuously monitored and the fault signal is output when the actuator system moves back from a high actuator position to a low actuator position. In this case, the proposed method is used in particular in the case of a change in position in which the hydraulic fluid is preferably expected to be sucked from the planetary roller transmission into the piston unit.

In a further development, the evaluation of the continuous pressure and displacement measurement takes place during a diagnostic process which is carried out from a predetermined ambient temperature of the actuator system. This takes into account the fact that the hydraulic fluid becomes viscous, in particular at low ambient temperatures, and the described suction process can occur, so that the diagnostic process can be started reliably at the low ambient temperatures.

In order to prevent mechanical damage to the hydrostatic clutch actuator, a sniffing process is triggered as a result of the fault signal. In such a sniffing process, volume compensation takes place in which the change in volume of the hydraulic fluid is compensated for by an inflow of hydraulic fluid from a storage volume or by the hydraulic fluid flowing off into a storage volume. This reliably prevents damage to the actuator system.

In one embodiment, the triggered sniffing request immediately initiates a sniffing process. Such an immediate initiation of the sniffing process is recommended, as the effect occurs in particular at low temperatures and, depending on the use of the clutch, e.g. as a separating clutch in a hybrid system, significant warming and the associated expansion of the hydraulic fluid can be expected through operation of the hybrid system.

BRIEF DESCRIPTION OF THE DRAWINGS

The method allows for numerous embodiments. One of these embodiments will be explained in more detail with reference to the figure shown in the drawing, wherein.

DETAILED DESCRIPTION

Figure 1:
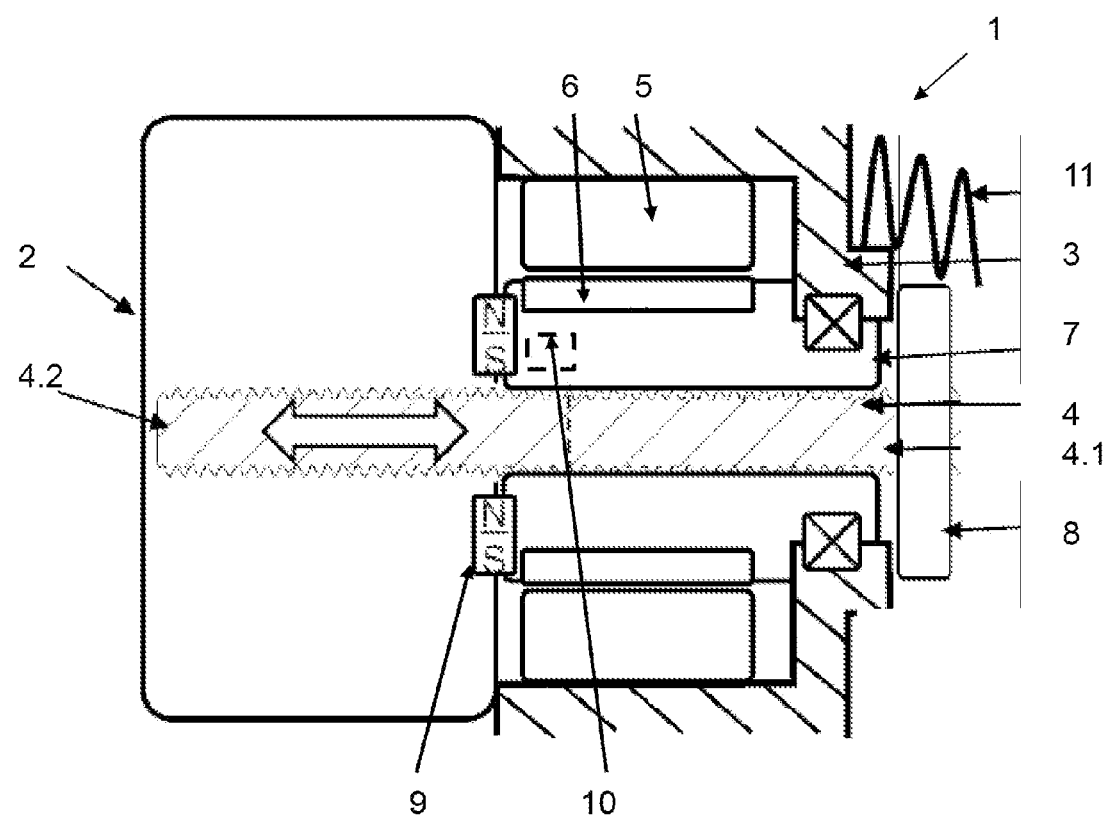
FIG. 1 shows a schematic diagram of a hydraulic actuator for carrying out the method.

FIG. 1 shows a schematic diagram of a hydraulic actuator for carrying out the method. The hydraulic clutch actuator 1 comprises a control unit 2, which controls an electric motor for actuating the clutch actuator 1. The control device 2 is designed as a module which is connected to a hydraulic module 3. When the position of the clutch actuator 1 changes, a spindle 4 can be moved on both sides along an axial actuator path. The spindle 4 is driven by the electric motor, which has a stator 5. A rotor 6 is mounted radially inside the stator 5 and is in engagement with the spindle 4 via a planetary roller transmission (not shown). The planetary roller transmission is encased in a sleeve 7. At the end 4.1 of the spindle 4 facing away from the control unit 2, a pressure piece 8 is attached which acts (not shown) on an element of a hydraulic path, such as a master cylinder. Bellows 11, which protect the actuator 1 from contamination, extends between the pressure piece and the hydraulic module 3.

The distance covered by the clutch actuator 1 along the actuator path is detected by a multi-turn angle sensor 9 over several revolutions of the spindle 4. A pressure sensor 10, which is arranged in the hydraulic path, detects a change in volume of a hydraulic fluid that fills the hydraulic path and also the planetary roller transmission.

Figure 2:
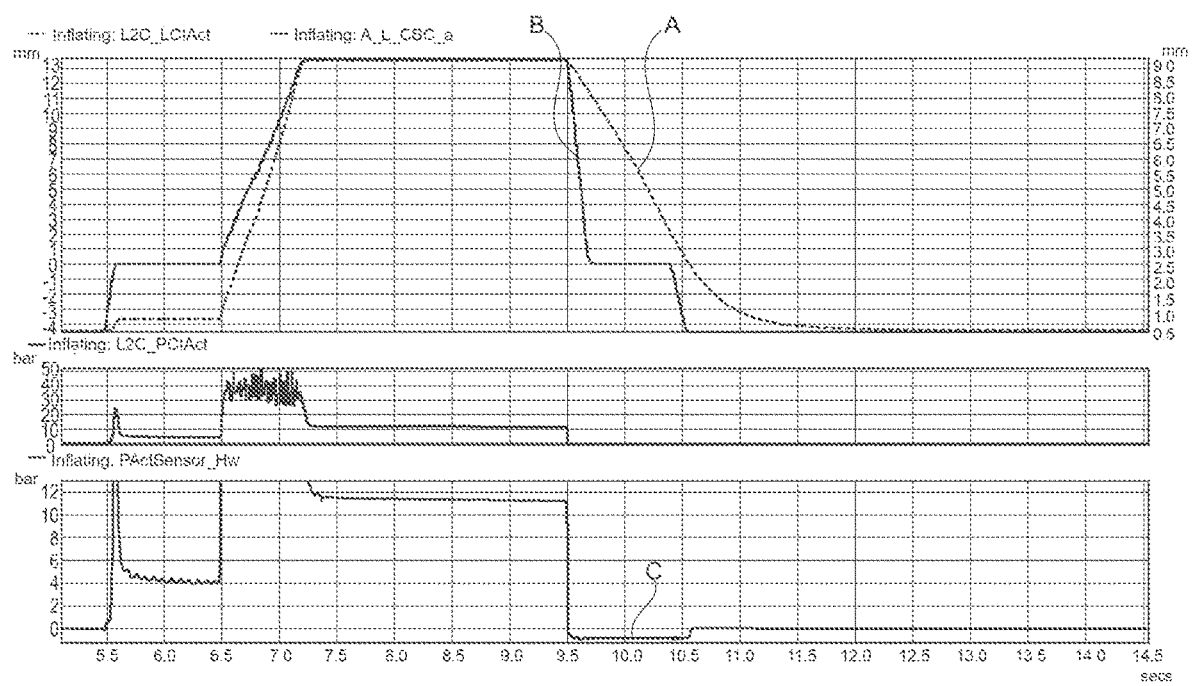
FIG. 2 shows an exemplary embodiment of the movement of the master and slave cylinders at low temperatures.

Diagnostic software is implemented in the control device 2 of the actuator system 1, which continuously evaluates the pressure signal and the signal from the multi-turn angle sensor. In particular, the pressure signal is observed over an extended period of time. As can be seen from FIG. 2, in which the movement of the master and slave cylinders arranged in the hydraulic path are shown at low temperatures, such as −40° C., the slave cylinder actuating a clutch or a transmission (curve A) cannot follow the position of the master cylinder (curve B) when moving from a high actuator position to a lower actuator position. Particular attention is drawn to the different scaling of the master cylinder position and the slave cylinder position. When the master cylinder moves from the high position to the lower position, a pressure below 0 bar is quickly reached, as can be seen in curve C. This pressure below 0 bar corresponds to a pressure below 1 bar atmospheric pressure. The negative pressure in the master cylinder can have an effect on the seal, for example by folding it over or similar, and the hydraulic fluid can inadvertently penetrate from the planetary roller transmission chamber into the master cylinder. This state will be referred to as "inflating" in the following.

If the negative pressure signal is present for a period of, for example, 0.5 seconds below a predetermined pressure threshold of, for example, −0.2 bar, the "inflating" state is recognized. The control signal sets an "inflating" fault signal to true. When this fault signal is output, an increased sniffing request is output.

The sniffing request distinguishes between four states:
no sniffing,
sniffing if possible,
urgent sniffing, or
sniffing now.

This sniffing request can be triggered depending on the length of the period during which the pressure p is below 0 bar. It must be taken into account here that the possible shift in the characteristic curve of the clutch actuator 1, depending on the driving strategy of the vehicle, can only be eliminated in the distant future by a sniffing process. Since the clutch actuator 3 can heat up considerably at low temperatures, depending on the use of the clutch, as a result of the operation of the clutch and therefore an expansion of the hydraulic fluid is to be expected, a sniffing process is immediately triggered by the fault signal.

Figure 3:
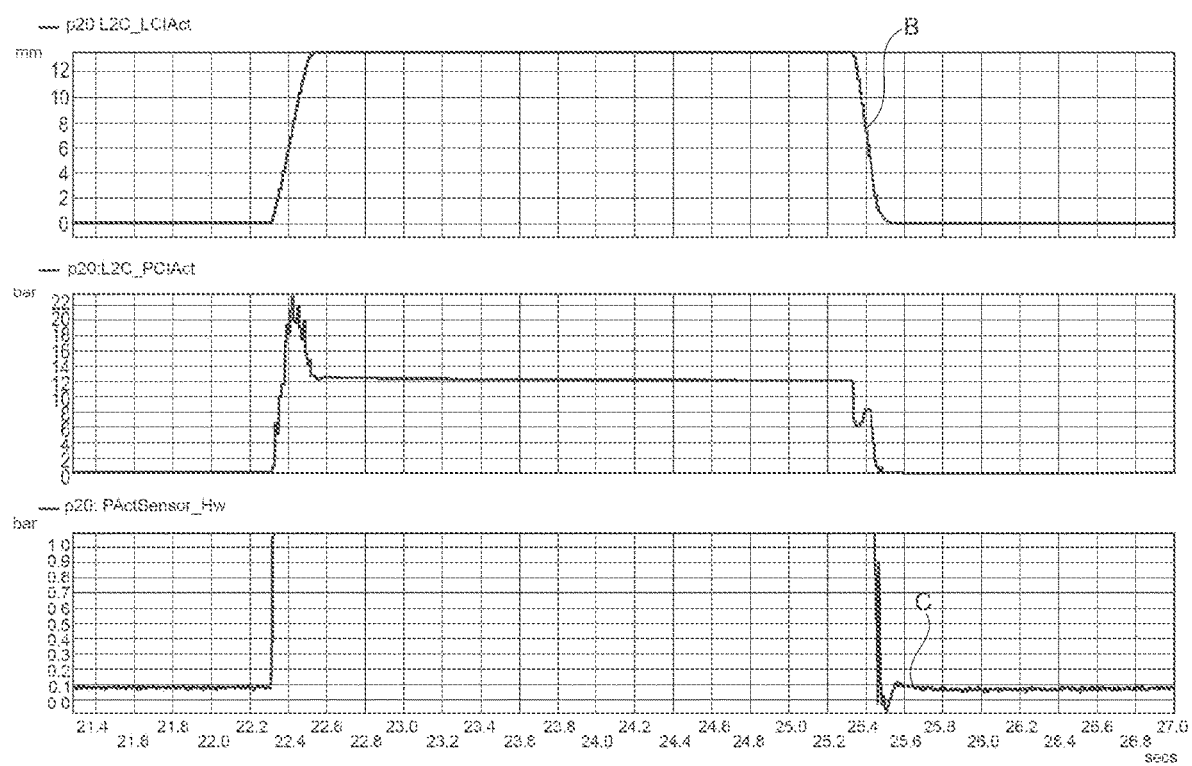
FIG. 3 shows an exemplary embodiment of the movement of the master cylinder of the actuator system at room temperature.

In FIG. 3, a position of the master cylinder at an ambient temperature of 20° is indicated, at which a pressure change below 0 bar can only be seen very briefly in curve C.

LIST OF REFERENCE SIGNS

1 Hydraulic clutch actuator
2 Control unit
3 Hydraulic module
4 Spindle
5 Stator
6 Rotor
7 Sleeve
8 Pressure piece
9 Multi-turn angle sensor
10 Pressure sensor
11 Bellows

The invention claimed is:

1. A method for operating a hydrostatic actuator system, in which an electric motor is used for delivering a hydraulic fluid in the actuator having a piston unit, in which a change in volume of the hydraulic fluid caused by a temperature change is sensed by a pressure measurement, wherein the pressure measurement is continuously evaluated, wherein, in the event of a negative signal of the pressure measurement, suction of the hydraulic fluid by a planetary roller transmission lying in the hydraulic fluid between the electric motor and a spindle into the piston unit is recognized and a fault signal is output, and in which a sniffing action is triggered on the basis of the fault signal to eliminate a shift in a characteristic curve.

2. The method according to claim 1, wherein the fault signal is output if the negative signal of the pressure measurement lasts for a predetermined period of time.

3. The method according to claim 1, wherein the negative pressure signal is less than −0.2 bar.

4. The method according to claim 2, wherein the predetermined time period is at least 0.3 seconds.

5. The method according to claim 1, wherein a position signal of the actuator is continuously monitored and the fault signal is output when the actuator moves back from a high actuator position to a low actuator position.

6. The method according to claim 5, wherein the continuous evaluation of the pressure signal and the position signal takes place during a diagnostic process which is carried out in response to a predetermined ambient temperature.

7. The method according to claim 1, wherein the sniffing action is immediately initiated in response to the fault signal.

8. An actuator system comprising:
a spindle;
a master cylinder;
a piston within the master cylinder and axially fixed to the spindle;
an electric motor driving the spindle via a planetary transmission, the planetary transmission being encased in a sleeve;
a pressure sensor within the sleeve; and
a controller programmed to evaluate a signal from the pressure sensor and output a fault signal in response to a negative pressure.

9. The actuator system according to claim 8, wherein the fault signal is output if the negative pressure lasts for a predetermined period of time.

10. The actuator system according to claim 9, wherein the predetermined time period is at least 0.3 seconds.

11. The actuator system according to claim 9, wherein the fault signal is output in response to the negative pressure being less than −0.2 bar.

12. The actuator system according to claim 8, further comprising a spindle position sensor and wherein the fault signal is output when the actuator moves back from a high actuator position to a low actuator position.

13. The actuator system according to claim 12, wherein the controller evaluates the pressure signal and a position signal during a diagnostic process which is carried out in response to a predetermined ambient temperature.

14. The actuator system according to claim 8, wherein a sniffing request is triggered on the basis of the fault signal.

15. The actuator system according to claim 14, wherein a sniffing process is immediately initiated in response to the fault signal.

\* \* \* \* \*